(12) United States Patent
Soibel et al.

(10) Patent No.: US 12,466,939 B2
(45) Date of Patent: Nov. 11, 2025

(54) RENEWABLY-SOURCED BIODEGRADABLE POLYOLEFIN PACKAGING

(71) Applicant: Enlightened Product Solutions, LLC, Miramar, FL (US)

(72) Inventors: Randy Soibel, Deerfield, IL (US); Robert Tammara, Miramar, FL (US)

(73) Assignee: ENLIGHTENED PRODUCT SOLUTIONS, LLC, Miramar, FL (US)

( * ) Notice: Subject to any disclaimer, the term of this patent is extended or adjusted under 35 U.S.C. 154(b) by 958 days.

(21) Appl. No.: 17/060,058

(22) Filed: Sep. 30, 2020

(65) Prior Publication Data

US 2021/0095098 A1    Apr. 1, 2021

Related U.S. Application Data (60) Provisional application No. 62/907,959, filed on Sep. 30, 2019.

(51) Int. Cl.
| | | |
|---|---|---|
| C08K 11/00 | (2006.01) | |
| B29D 22/00 | (2006.01) | |
| B65B 25/00 | (2006.01) | |
| B65D 1/34 | (2006.01) | |
| B65D 65/46 | (2006.01) | |
| B65D 85/78 | (2006.01) | |
| B29K 23/00 | (2006.01) | |

(52) U.S. Cl.
CPC ............ *C08K 11/00* (2013.01); *B29D 22/003* (2013.01); *B65B 25/001* (2013.01); *B65D 1/34* (2013.01); *B65D 65/466* (2013.01); *B65D 85/78* (2013.01); *B29K 2023/06* (2013.01); *B29K 2023/12* (2013.01); *B29K 2995/006* (2013.01)

(58) Field of Classification Search
CPC ......... C08K 11/00; B65B 25/00; B65D 65/46; B65D 1/34; B65D 85/78; B65D 22/00
USPC .......................................................... 523/124
See application file for complete search history.

(56) References Cited

U.S. PATENT DOCUMENTS

| | | | | |
|---|---|---|---|---|
| 4,736,885 A | * | 4/1988 | Negus, Sr. ........... | B65D 5/3621 229/110 |
| 5,378,738 A | * | 1/1995 | Deguchi .................. | C12N 1/00 523/124 |
| 2018/0100060 A1 | * | 4/2018 | LaPray ................... | C08L 23/06 |

* cited by examiner

*Primary Examiner* — Deve V Hall
(74) *Attorney, Agent, or Firm* — Pearson IP; Loren Donald Pearson (57) ABSTRACT

Renewably-sourced biodegradable polyolefin packaging includes a renewably-sourced polyolefin (for example, polyethylene and polypropylene) and a biodegrading agent. The renewably-sourced biodegradable polyolefin packaging is made from plant materials typically by polymerizing olefins that are made from reducing alcohols created by fermenting plant materials. An example of a suitable plant material is sugarcane and its derivatives. The biodegrading agent accelerates the biodegradation of polyolefin packaging even in anaerobic and dark (i.e. absent of ultraviolet light) environments. Such a packaging is particularly useful for packaging frozen food that is to be microwaved in the packaging. The package is also particularly usable as packaging for frozen comestibles, which are often stored at dry-ice temperatures. Ultimately, the renewably-sourced biodegradable polyolefin packaging provides a start-to-finish green packaging that meets the requirements of being renewably sourced, biodegradable in landfills, and having similar performance as traditional polyolefin packaging.

13 Claims, 5 Drawing Sheets

RENEWABLY-SOURCED BIODEGRADABLE POLYOLEFIN PACKAGING

CROSS-REFERENCE TO RELATED APPLICATIONS

This application claims the benefit of U.S. Provisional Application No. 62/907,959, filed Sep. 30, 2019, which is hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to renewably-sourced and biodegradable packaging and, more specifically, to polyolefin packaging.

Description of the Related Art

Packaging for cold environments or for cold goods can perform by holding the product while not deteriorating, delaminating, or becoming brittle at the anticipated temperature. For packaging that will be exposed to dry ice, the packaging can perform at −78.5° C. For packaging that will be used with food that is blast frozen, the packaging can perform at −40° C. For packaging that will be used with a conventional freezer, the packaging can perform at −18° C.

Packaging that is to be used with frozen comestibles, particularly, dairy based frozen comestibles, the packaging can perform at room temperature (i.e. 25° C.) even when exposed to liquid (i.e. melted) food. For example, the packaging preferably cannot absorb liquid or become fragile or saggy when exposed to liquid.

Packaging for ice cream and gelato is made from nonrenewable and/or nonrecyclable materials. The most common materials for packaging are closed cell extruded polystyrene foam (XPS), stainless steel, and polymer treated cardboard. XPS is a petroleum-based product, which is a nonrenewable material. Stainless steel is made with iron, which is a nonrenewable material. Polyethylene treated cardboard is not renewable because polyethylene is petroleum based and, therefore, is a nonrenewable material. An additional problem with polyethylene coated cardboard is that the polyethylene cannot be economically separated from the cardboard. As a result, the entirety of the coated paper becomes nonrecyclable.

Packaging to be used with heated products is made with nonrenewable materials. Pawlick et al., U.S. Pat. No. 8,302, 528, describes a, "Cooking Method and Apparatus." At column 9, lines 13-15, Pawick et al. states, "The containers 22, 122 and baskets 24, 24', 124, 124', 124" may be made of polymers, such as Polypropylene (PP) (e.g., Co-polymer Polypropylene), Crystallized Polyethylene Terephthalate (CPET), or any other microwave and food safe non-toxic material."

Packaging to be used with heated food products can perform at 204° C. Packaging to be used with steam heat food products can perform at a temperature slightly above boiling (>100° C.), for example 104° C.

Retailers of frozen comestibles are facing pressures to reduce the consumption and disposal of petroleum-based and metallic materials. The pressure comes in many forms. Regulations limit or impose taxes on the amount of petroleum-based and metallic products disposed by the retailer. The purchase cost of petroleum-based and metallic products is rising. Finally, customers see decreased value in products packaged with petroleum-based or metallic materials.

Plastics are materials formed by polymers and additives, characterized by high molecular weight. Their versatility makes them an essential material in different application; they are used in packaging (39.9%), construction (19.8%), the automotive industry (9.8%), electronics and communications (6.2%), agriculture (3.4%), household leisure and sport (4.1%), and other fields (16.7%). Among the different plastics, the most commonly used in packaging are polypropylene (PP), low-density polyethylene (LDPE), high-density polyethylene (HDPE), vinyl chloride (PVC), polyurethane (PU), polyethylene terephthalate (PETE), and polystyrene (PS). Most plastics are durable and resistant to degradation; this is the feature that makes them very attractive for many applications. However, these characteristics have adverse effects once plastic products are discarded. In 2015, 6300 Mt of plastic was produced; 9% was recycled, 12% was incinerated, and 79% was landfilled or littered in the environment.

The vast majority of polyolefins including polyethylene and polypropylene is made from non-renewable sources. The non-renewable sources used to form most polyolefins include petroleum, naphtha, and natural gas.

A line of renewably-sourced polyethylene and polypropylene by Braskem S.A. are sold under the trademark I'M GREEN®.

Manufacturers have adopted packaging made of polyolefins because they are low cost and durable.

An unintended consequence of polyolefins' durability is its extremely slow biodegradation.

Biodegrading agents are additives to be mixed with polyolefin starting materials (i.e. pelletized polyolefins) to increase the biodegradability of polyolefins without reducing the performance and attributes of the polyolefin. Biodegrading agents are sold under the trademark BIOSPHERE®. Biodegrading agents are sold under the trade name ECM MASTERBATCH PELLETS.

One way to measure the biodegradability of packaging is standardized in ASTM D5511.

BRIEF SUMMARY OF THE INVENTION

With the foregoing and other objects in view there is provided, in accordance with the invention, renewably-sourced biodegradable polyolefin packaging.

Renewable-sourced Polyolefins

A method for making renewably-sourced polyolefins is taught in Morschbaker, U.S. Pat. No. 8,835,703, titled, "Method for the Production of One or More Olefins, an Olefin, and a Polymer," which is hereby incorporated by reference.

The method begins with natural agricultural raw materials. The natural agricultural raw materials originate from sugarcane bagasse, sugarcane straw, corn straw, corn cobs, and sorghum straw. Optionally, the natural agricultural raw materials can include residues of other agricultural crops, urban or industrial residues, as well as residues originating from fishing, animal breeding, or mining activities, such as, among others, beet, manioc, wheat, rice straw, peanut shells, coconut shells, wood kindling, wood chips, sawdust, charcoal, wax palm leaves, babassu palm residues, various types of grasses, leaves, and branches of some plants, residues of the process of production of vegetable oils, such as filtercakes obtained from the production oils of soy, of castor beans and plants, and of other leaginous plants, recycled vegetable oils, animal fats, algae, recycled paper and paperboard, lignin and other residues from the paper and pulp industry originating from crops such as eucalyptus and pine, garbage, biogas derived from fermentation, glycerol, or residues containing glycerol, shellfish shells or bird feathers. The common trait among these renewable natural raw materials is that they are simultaneously rich in starch and/or sugar and in lignocellulosic materials.

In the next step of the method, the renewable natural raw materials are fermented to form ethanol. Various processes for fermenting particular raw materials can be applied. For example, sugarcane can be fermented using *Saccharomyces cerevisiae* yeast to produce ethanol and carbon dioxide.

In the next step, ethylene is produced through dehydration of ethanol. Processes for dehydrating alcohols to form ethylene are described in the following documents, which are hereby incorporated by reference: "Ethylene from Ethanol," Scheeline et al., *PEP Review* 79-3-4, January 1980; U.S. Pat. Nos. 4,232,179; 4,234,752; 4,396,789, 4,529,827, and international patent application WO 2004/078336. A process to produce olefins from the dehydration of one or more light alcohols, using ionic liquids is described in do Carmo et al., U.S. Pat. No. 9,181,143, which is hereby incorporated by reference.

An alternate or additional step includes generating synthesis gas by using a biomass gasification process. The synthesis gas is used to produce methanol. In turn, the methanol is used for the formation of propylene, directly or indirectly from the intermediate dimethyl ether, as described in the following patents: U.S. Pat. No. 4,929,780, EP 448000, and U.S. Pat. No. 6,534,692.

The next step is transforming methanol and/or dimethyl ether into propylene, ethylene, and butylene.

The next step is to transform propylene, ethylene, and butylene to form renewably-sourced polypropylene and its copolymers, polyethylene and its copolymers.

Biodegrading Agents

Biodegrading agents, which are also referred to as biodegradable additives, enhance the biodegradation of plastic by adding hydrophilic parameters to the polymer chain. The hydrophilic parameters allow microbial enzymatic action to reduce the structure of the polymer by utilizing macromolecules within the plastic polymer. The inclusion of biodegrading agents should not change the physical properties of the plastic. The macromolecules are consumable by microbes. The consumption of the macromolecules by the microbes creates breaks in the chains of polyolefins and results in the degradation of the polyolefin.

The biodegrading agent should be mixed throughout the polyolefin. Microbes will breakdown carbon to carbon bonds that involve the biodegrading agent even when the biodegrading agent is spread throughout the polyolefin, including within the polyolefin. The consumption of the biodegrading agent increases the exposed surface area of the now-pitted polyolefin. Plastophillic microbes can attach themselves with pores of the polymer and are not limited to attaching to the surface of the polyolefin.

The biodegrading agent is hydrophilic. The addition of the biodegrading agent makes the mixture more hydrophilic. Increasing the hydrophilicity of the mixture increases the biodegradation.

The biodegrading agent increases the biodegradability of the polyolefin by increasing hydrolysis, acidogenesis, acetogenesis, and methanogenesis.

Another type of biodegrading agent is a pro-oxidant additive. Pro-oxidant additives increase the rate of both thermo-oxidation and photo-oxidation, resulting in a larger amount of low molecular extractable compounds. Microbial strains can then efficiently attack the carbon in these low molecular weight fragments of the large chain polymers.

Pro-oxidant additives are commonly used to enhance the rate of biodegradation of ethylene and polyethylene. High-molecular-weight polyethylene hinders the ability of microorganisms to naturally degrade the materials. Pro-oxidant additives have been effective in increasing the biodegradability of polyethylene by creating smaller fragments of the polymer.

Typical pro-oxidant additives are the transition metal complexes or transient metal ions, which are added to the plastic in the form of stearate or other organic ligand complexes. The most common materials used as pro-oxidants are iron, manganese, and cobalt. Iron complexes increase the rate of photooxidation by providing a source or radicals for the initiation step in the process of creating smaller molecular weight fragments.

An object of the invention is to provide a method for making renewably-sourced biodegradable polyolefins. The method begins with providing renewably-sourced polyolefins, which typically, but not necessarily, are pelletized. To the polyolefins, the biodegradable agent are mixed and melted to form a resin mixture. Next, the molten resin mixture is shaped to the desired packaging shape. Injection molding can be used to shape the molten resin into the package shape, for example, a bottle-shape. The biodegradable agent works in anaerobic conditions and does not require ultraviolet light to increase the biodegradation of the resin.

A further object of the invention is to provide renewably-sourced biodegradable packaging that is biodegradable. The packaging can include renewably-sourced biodegradable polyolefins and a biodegradable agent. Examples of suitable biodegrading agents are sold under the trademark BIOSPHERE® PLASTIC ADDITIVE. The polyolefin/biodegradable-agent mixture is from ninety-eight to ninety-nine-and-five-tenths percent (98-99.5%) by weight polyolefin and five-tenths to two percent (0.5-2%) by weight biodegradable agent.

In accordance with the objects of the invention, renewably-sourced biodegradable polyolefin packaging is provided. The renewably-sourced biodegradable polyolefin includes a renewably-sourced polyolefin and a biodegrading agent mixed with said renewably-sourced polyolefin. The biodegrading agent increases biodegradation of the renewably-sourced polyolefin. Examples of renewably-sourced biodegradable polyolefin are renewably-sourced polyethylene and renewably-sourced polypropylene. The biodegrading agent forms an effective amount of the renewably-sourced-polyolefin/biodegrading-agent mixture. The effective amount of the biodegradable agent in the of the renewably-sourced-polyolefin/biodegrading-agent mixture usually ranges 0.5% to 2.0% by weight.

The biodegrading agent anaerobically biodegrades the renewably-sourced polyolefin without using ultraviolet light.

In accordance with the objects of the invention, a method for manufacturing renewably-sourced biodegradable polyolefin packaging is provided. The first step is providing renewably-sourced polyolefin. The next step is admixing a biodegrading agent with the renewably-sourced polyolefin to produce a resin mixture. The biodegrading agent increases biodegradation of the renewably-sourced polyolefin. The next step is melting the resin mixture to form a molten resin mixture. The next step is molding the molten resin mixture into packaging.

In accordance with the objects of the invention, a method for forming renewably-sourced polyolefin is provided. The renewably-sourced polyolefin is made by transforming renewably-sourced light alcohols into olefins and polymerizing the olefins into the renewably-sourced polyolefin. The light alcohols can be sourced from plant material. In particular, the plant material can include sugarcane and sugarcane derivatives.

The invention includes a method for using renewably-sourced biodegradable polyolefin packaging. The method for using includes biodegrading the packaging. The biodegrading occurs anaerobically and without ultraviolet light, for example while buried in a landfill.

The invention includes a method of packaging food. The method begins with the step of placing food within a renewably-sourced biodegradable polyolefin package. The renewably-sourced biodegradable package includes renewably-sourced polyolefin and a biodegrading agent mixed with the renewably-sourced polyolefin. In the case of frozen food, the next step is storing the packaging and said food at a temperature below zero degrees Celsius (<0° C.). In the case of packaging that is to be used when reheating by microwave, the method includes microwaving the packaging and the food.

The renewably-sourced biodegradable packaging is particularly useful for packaging frozen comestibles, such as ice cream and gelato. The renewably-sourced biodegradable packaging can be used to from an ice create carton. To package gelato, a gelato tray is provided. The gelato tray includes a front wall, a right wall connected to the front wall, a rear wall connected to the right wall, a left wall connected to the rear wall and the front wall, a bottom connected to the front wall (the right wall, the rear wall; and the left wall), and a rim connected to and extending outward from the front wall, the right wall, the rear wall, and the left wall. The front wall, the right wall, the rear wall, the left wall, the bottom, and the rim are made of renewably-sourced biodegradable polyolefin, the renewably-sourced biodegradable polyolefin.

Other features that are considered as characteristic for the invention are set forth in the appended claims.

Although the invention is illustrated and described herein as embodied in renewably-sourced biodegradable polyolefin, the invention should not be limited to the details shown in those embodiments because various modifications and structural changes may be made without departing from the spirit of the invention while remaining within the scope and range of equivalents of the claims.

The construction and method of operation of the invention and additional objects and advantages of the invention is best understood from the following description of specific embodiments when read in connection with the accompanying drawings.

DETAILED DESCRIPTION OF THE INVENTION

Embodiments of the invention are described below and are shown in the figures of the drawing.

Renewably-sourced Biodegradable Polyethylene Packaging

A preferred embodiment of the invention is renewably-sourced biodegradable polyethylene packaging. The packaging is formed with a mixture of ninety-eight to ninety-nine-and-five-tenths percent (98-99.5%) by weight of renewably-sourced polyethylene and five-tenths to two percent (0.5-2%) by weight of biodegrading agent. The renewably-sourced polyethylene is produced by polymerizing ethylene, where the ethylene is produced by reducing light alcohols sourced from fermented sugarcane. The preferred biodegrading agent is the biodegrading agent sold under the trademark BIOSPHERE® PLASTIC ADDITIVE.

Laminate

Figure 1:
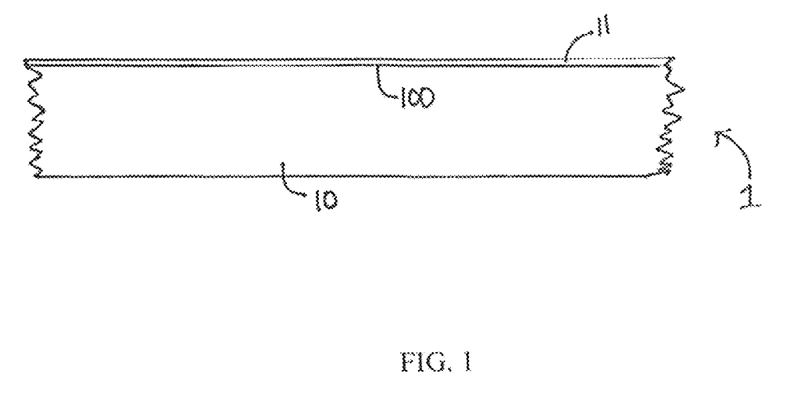
FIG. 1 is a sectional view of a laminate according to the invention.

FIG. 1 is a first preferred embodiment of a laminate 1 for making food containers. The laminate 1 includes a base layer 10 and a coating 11. The base layer 10 is made from a renewable or sustainable material. The coating 11 is adhered to a surface 100 of the base layer 10 that will be facing the interior of the container when folded into the container. The base layer 10 has a thickness of 0.050 cm.

FIG. 1 also shows a second preferred embodiment of a laminate 1 for making packaging. The laminate 1 includes a base layer 10 and a coating 11. The base layer 10 is made from a renewable or sustainable material. Examples of renewable or sustainable materials include paper, cardboard, polylactic acid, and bamboo-sourced stock. The coating 11 is adhered to a surface 100 of the base layer 10 that will be facing the interior of the container when folded into the container. The base layer 10 has a thickness of 0.050 cm. The coating 11 is made from a film of renewably-sourced biodegradable polyolefin.

Figure 2:
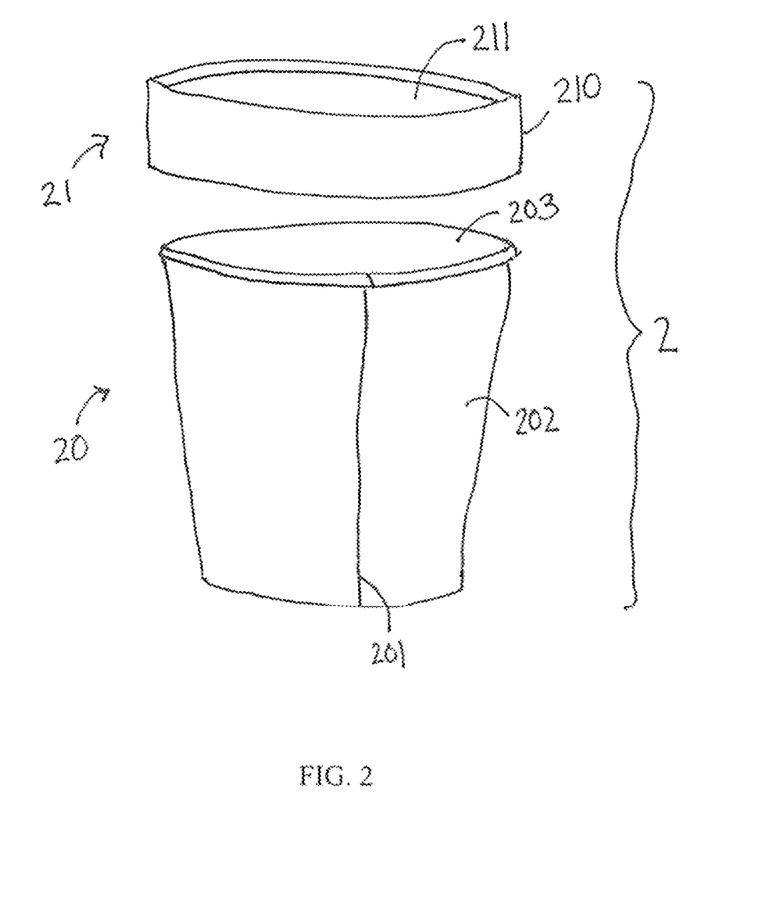
FIG. 2 is a perspective view of an ice-cream container according to the invention.

FIG. 2 shows a preferred embodiment of a container 2. In this embodiment, the container 2 is intended to be used to hold food and used once (i.e. single use). The container 2 is made from the laminate 1. The container 2 includes a carton 20 and a lid 21. The carton 20 has a wall 202 that is folded onto itself to form a seam 201. The carton 20 has a rim 204.

The inside surface 203 of the wall 202 is covered with the coating 11. The lid 21 is made of the laminate 1 and has a wall 210 and a top 211.

Figure 3:
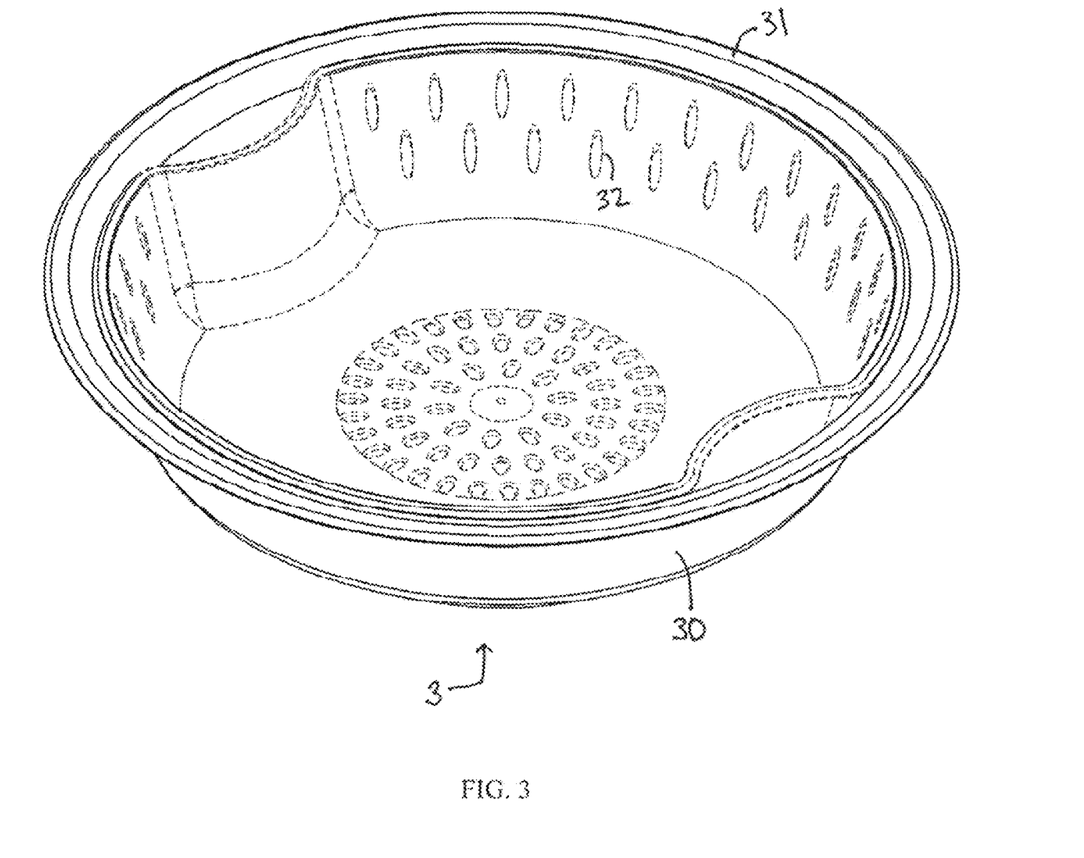
FIG. 3 is a perspective view of a steaming tray according to the invention.

FIG. 3 shows a preferred embodiment of packaging: a steaming tray 3. The steaming tray 3 includes a cover 30. The cover 30 has a rim 31 around its periphery. The cover 30 has perforations 32 formed therein. In a first preferred embodiment, the steaming tray 3 is made of the laminate 1 in which the base layer 10 is made from a renewable or sustainable material. In a second preferred embodiment, the steaming tray 3 is made of the laminate 1 in which the base layer 10 is made of a renewably-sourced biodegradable polyolefin. In a third preferred embodiment, the steaming tray 3 is made of renewably-sourced biodegradable polyolefin. Two suitable examples of the polyolefin are polyethylene and polypropylene. The third embodiment is made by injection molding the renewably-sourced biodegradable polyolefin into the shape of the steaming tray 3.

Preferred methods of using the steaming tray 3 include combinations of at least one of the following steps. One step is placing food within a container that includes the steaming tray 3. The next step is freezing the food by cooling the container that includes the steaming tray 3 to a temperature below freezing (i.e. <0° C.). If the food is to be blast frozen, then the next step is to freeze by cooling the food and the container that includes the steaming tray 3 to a temperature equal to or less than negative forty degrees Celsius (≤−40° C.). If the food is to be stored and cooled with dry ice, then the next step is to freeze the food and the packaging that includes the steaming tray 3 to negative seventy eight or lower degrees Celsius (≤−78° C.). Once in its desired frozen state, the food and the container that includes the steaming tray 3 are stored, shipped, and distributed. In the next step, a retailer sells the food and the container that includes the steaming tray 3 at a temperature below freezing (<0° C.). The purchaser/consumer/end user keeps the frozen food held in the container that includes the steaming tray in a freezer at a temperature below freezing (<0° C.). When the food preparer or end user is ready to eat the frozen food, the container that holds the frozen food along with the steaming tray 3 is heated in a microwave. The steaming tray 3 is exposed to steam which is at the temperatures equal to the boiling point of water (i.e. 100° C.). The next is to uncover the now cooked food by removing the steaming tray 3.

Figure 4:
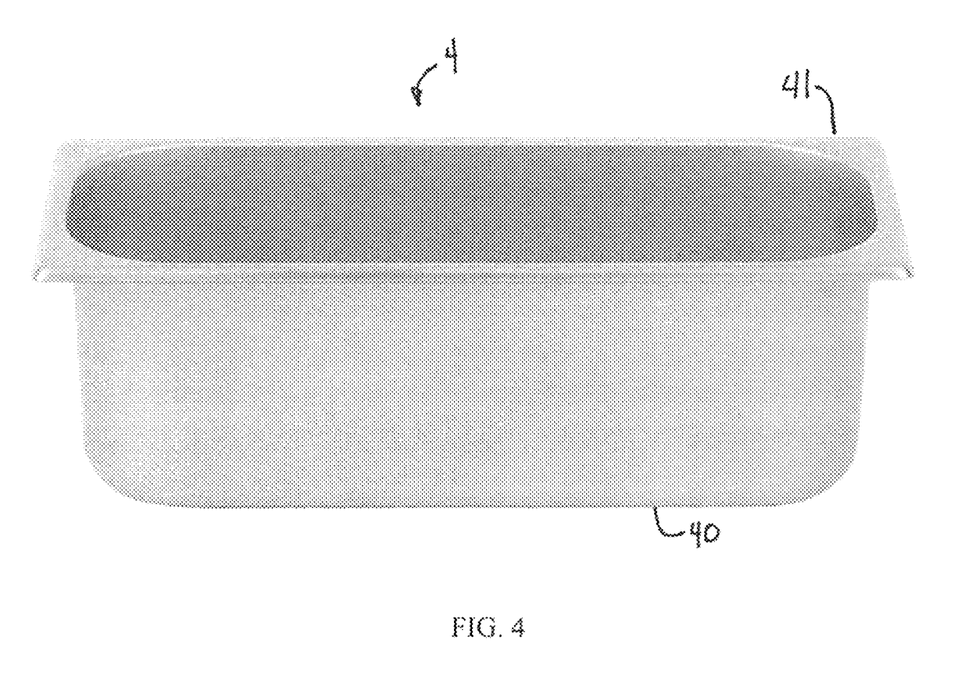
FIG. 4 is a perspective view of a gelato tray according to the invention.
Figure 5:
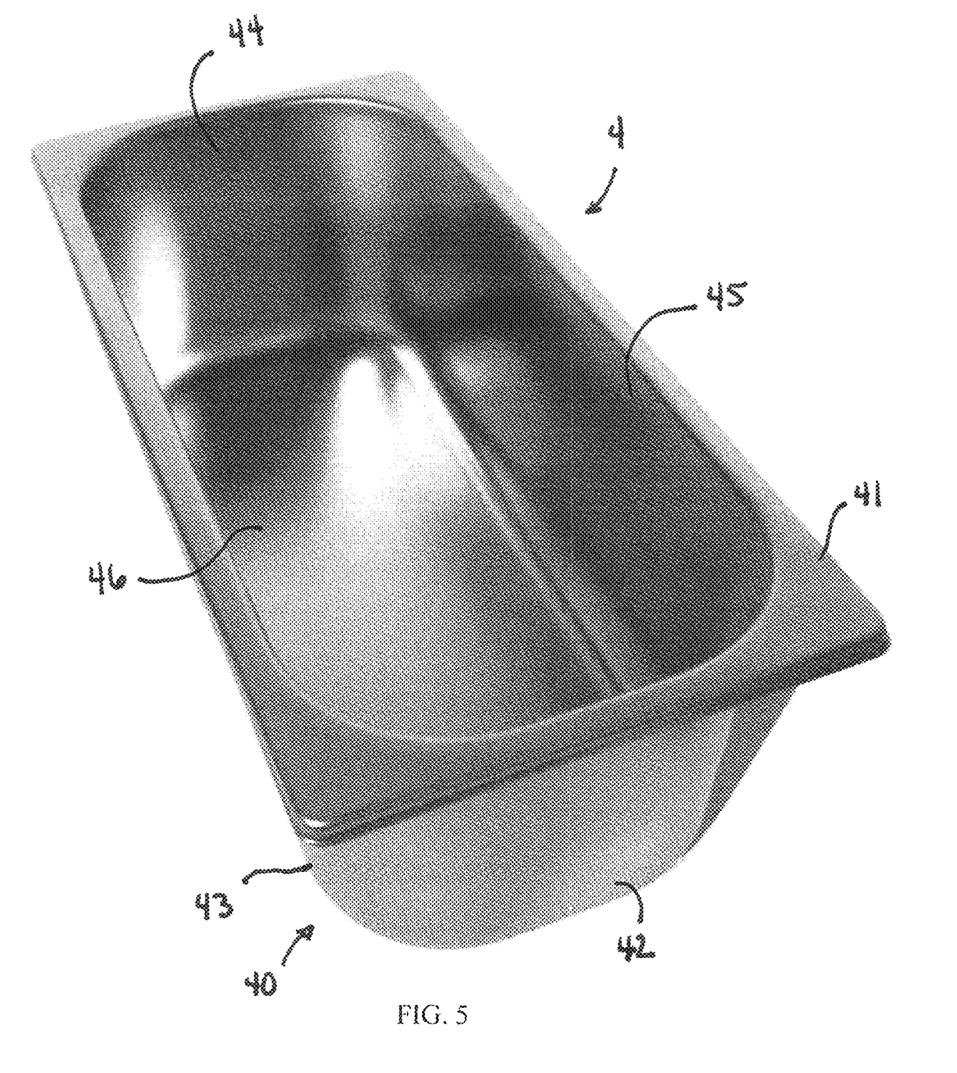
FIG. 5 is a perspective view of the gelato tray shown in FIG. 4.

FIGS. 4-5 shows a gelato tray 4. The gelato tray 4 includes a rounded cuboid container 40 an opening at a top of the rounded cuboid container 40 and a rim 41 extending peripherally from a top edge of the rounded cuboid container 40. While FIGS. 4-5 does not show a lid for the gelato tray 4, a lid can be added. The cuboid container 40 has a front wall 42, a right wall 43, a rear wall 44, a left wall 45, and a bottom 46.

The laminate 1 performs as packing for food in the temperature that range from negative-seventy-nine (i.e. dry ice) to two-hundred-four degrees Centigrade (−79-204° C.). The laminate 1 performs after sustained exposure in the ranges from −40° C. (I.e. blast freeze) to −18° C. (i.e. conventional freezer) and −18° C. to 104° C. (microwaving water=100° C.) and 4° C. (refrigerator) to 104° C. The laminate 1 performs as packaging during short exposure (i.e. two days or less, most likely less than one day) to −79° C. is possible.

In a first embodiment, the gelato tray 4 is made from the laminate 1 that has been molded to the shape. The coating 11 of the laminate 1 faces an interior of the rounded cuboid container 40. In the first preferred embodiment, the base layer 10 is made from polylactic acid (PLA), where the PLA is corn based.

In a second preferred embodiment of the gelato tray 4, the base layer 10 is made of cellulose acetate proprionate (CAP). The CAP can be soy based, tree based, or grass based (e.g. bamboo).

The container 2, the steaming tray 3, and the gelato tray 4 are formed by thermoforming, compression molding, injection molding, extruding, additive manufacturing, and/or splitting, cutting, gluing, and coating sheets of the laminate 1.

While the embodiments show examples of the invention, the scope of the invention should not be limited to those examples, but rather set by scope of the entire specification and claims.

What is claimed is:

1. Renewably-sourced biodegradable polyolefin packaging for frozen food, consisting essentially of:
   polymer chains being formed of renewably-sourced polyolefin mixed with hydrophilic parameters of a polyolefin biodegrading agent to form a mixture, said polyolefin biodegrading agent forming 0.5 to 2.0% by weight of said mixture, said polyolefin biodegrading agent including polyolefin with hydrophilic parameters.

2. The renewably-sourced biodegradable polyolefin packaging according to claim 1, wherein said renewably-sourced polyolefin is renewably-sourced polyethylene.

3. The renewably-sourced biodegradable polyolefin packaging according to claim 1, wherein said renewably-sourced polyolefin is renewably-sourced polypropylene.

4. The renewably-sourced biodegradable polyolefin packaging according to claim 1, wherein said renewably-sourced polyolefin is produced from light alcohols.

5. The renewably-sourced biodegradable polyolefin packaging according to claim 4, wherein said light alcohols include bio-ethanol.

6. The renewably-sourced biodegradable polyolefin packaging according to claim 5, wherein said bio-ethanol is produced from fermented sugarcane.

7. The renewably-sourced biodegradable polyolefin packaging according to claim 1, wherein said polyolefin biodegrading agent forms from 0.5% to 2.0% by weight of the packaging.

8. The renewably-sourced biodegradable polyolefin packaging according to claim 1, wherein said biodegrading agent anaerobically biodegrades said renewably-sourced polyolefin.

9. The renewably-sourced biodegradable polyolefin packaging according to claim 8, wherein said biodegrading agent biodegrades said renewably-sourced polyolefin without using ultraviolet light.

10. A gelato tray for holding a frozen comestible, comprising:
    a front wall;
    a right wall connected to said front wall;
    a rear wall connected to said right wall;
    a left wall connected to said rear wall and said front wall;
    a bottom connected to said front wall, said right wall, said rear wall; and
    a rim connected to and extending outward from said front wall, said right wall, said rear wall, and said left wall, said front wall, said right wall, said rear wall, said left wall, said bottom, and said rim being formed of a biodegrading agent mixture including:
    a renewably-sourced polyolefin; and a biodegrading agent being mixed with said renewably-sourced polyolefin, said biodegrading agent forming 0.5 to 2.0% by weight of said biodegrading agent mixture.

11. The packaging according to claim 1, wherein a mixture of said renewably sourced polyolefin and said biodegrading agent is configured to hold food at a temperature of zero degrees Celsius.

12. The packaging according to claim 11, wherein said mixture is further configured to hold said food at a temperature of one-hundred degrees Celsius.

13. The packaging according to claim 11, wherein said food is a frozen comestible.

* * * * *